US008533928B2

(12) United States Patent
Diehl et al.

(10) Patent No.: US 8,533,928 B2
(45) Date of Patent: Sep. 17, 2013

(54) METHOD AND APPARATUS FOR THE ATTACHMENT OF A FASTENER ELEMENT TO A COMPONENT, IN PARTICULAR TO A SHEET METAL PART

(75) Inventors: Oliver Diehl, Bad Homburg v.d.H (DE); Richard Humpert, Bad Nauheim (DE)

(73) Assignee: Profil Verbindungstechnik GmbH & Co., KG, Friedrichdorf (DE)

( * ) Notice: Subject to any disclaimer, the term of this patent is extended or adjusted under 35 U.S.C. 154(b) by 777 days.

(21) Appl. No.: 12/770,804

(22) Filed: Apr. 30, 2010

(65) Prior Publication Data
US 2010/0275433 A1 Nov. 4, 2010

Related U.S. Application Data

(63) Continuation-in-part of application No. 11/117,752, filed on Apr. 28, 2005, now Pat. No. 7,735,209.

(30) Foreign Application Priority Data

Apr. 28, 2004 (DE) .......................... 10 2004 020 676

(51) Int. Cl.
*B23P 11/00* (2006.01)
(52) U.S. Cl.
USPC ................... 29/514; 29/505; 29/509; 29/521; 29/525.11; 29/525.13; 29/243.5
(58) Field of Classification Search
USPC ........... 29/514, 505, 509, 521, 524.1, 525.01, 29/525.06, 525.11, 525.13, 243.5, 243.53
See application file for complete search history.

(56) References Cited

U.S. PATENT DOCUMENTS

| | | | | |
|---|---|---|---|---|
| 5,634,674 A | * | 6/1997 | Fuser | 285/353 |
| 6,161,273 A | * | 12/2000 | Rivera et al. | 29/525.06 |

(Continued)

FOREIGN PATENT DOCUMENTS

| | | |
|---|---|---|
| DE | 13 00 800 B | 8/1969 |
| DE | 35 07 489 A1 | 4/1986 |

(Continued)

OTHER PUBLICATIONS

English Language translation of German Search Report dated Nov. 29, 2004 corresponding to German Patent Application No. 10 2004 020 676.7.

(Continued)

*Primary Examiner* — Peter DungBa Vo
*Assistant Examiner* — Kaying Kue
(74) *Attorney, Agent, or Firm* — Hershkovitz & Associates, PLLC; Abraham Hershkovitz; Eugene C. Rzucidlo (57) ABSTRACT

A method and an apparatus for the attachment of a fastener element to a component, for example a sheet metal part, wherein the fastener element is a nut element and has an axis of symmetry, a head part having a contact surface which enters into contact with the component, a threaded bore and also at least one undercut which receives the material of the component, and wherein the material of the component is pressed against the contact surface and into the undercut by means of a first tool having a die button shape matching the design of the nut element. A local force is exerted on the head part of the nut element or onto the tool to the side of the axis of symmetry and is moved circularly around the axis of symmetry while simultaneously carrying out a relative feed movement between the tool and the nut element between which the component is arranged in order to press the material of the component into the undercut.

17 Claims, 10 Drawing Sheets

(56) References Cited

U.S. PATENT DOCUMENTS

| | | | |
|---|---|---|---|
| 6,473,957 B1 * | 11/2002 | Voelkner et al. | 29/505 |
| 6,763,568 B1 * | 7/2004 | Mauermann et al. | 29/432.2 |
| 7,080,438 B2 * | 7/2006 | Murakami | 29/428 |
| 7,377,021 B2 * | 5/2008 | Mauermann et al. | 29/525.05 |
| 7,380,326 B2 * | 6/2008 | Kovac | 29/505 |
| 7,480,971 B2 * | 1/2009 | Oliver et al. | 29/33.5 |
| 2002/0125297 A1 * | 9/2002 | Stol et al. | 228/112.1 |
| 2005/0177993 A1 * | 8/2005 | Bergkvist | 29/514 |
| 2005/0229378 A1 * | 10/2005 | Dietrich et al. | 29/514 |
| 2006/0288559 A1 * | 12/2006 | Ghiran | 29/432 |

FOREIGN PATENT DOCUMENTS

| | | |
|---|---|---|
| DE | 195 35 537 A1 | 3/1997 |
| DE | 199 27 103 A1 | 12/2000 |
| DE | 100 32 816 A1 | 1/2002 |
| DE | 101 02 712 A1 | 8/2002 |
| DE | 102 58 928 A1 | 7/2004 |
| EP | 0 678 679 B1 | 6/1998 |
| EP | 0 759 510 B1 | 3/2000 |
| EP | 0 957 273 B1 | 6/2003 |
| EP | 0 958 100 B1 | 11/2003 |
| SE | 521 812 C2 | 12/2003 |
| WO | WO 99/15304 | 1/1999 |

OTHER PUBLICATIONS

German Search Report dated Nov. 29, 2004 corresponding to German Patent Application No. 10 2004 020 676.7.

International Search Report for PCT/EP2005/004588, dated Nov. 10, 2005.

* cited by examiner

METHOD AND APPARATUS FOR THE ATTACHMENT OF A FASTENER ELEMENT TO A COMPONENT, IN PARTICULAR TO A SHEET METAL PART

CROSS-REFERENCE TO RELATED APPLICATIONS

This is a Continuation-in-part application of U.S. application Ser. No. 11/117,752, filed on Apr. 28, 2005, entitled "Method and apparatus for the attachment of a fastener element to a component, in particular to a sheet metal part", which claims priority of German Patent Application No. 10 2004 020 676.7, filed Apr. 28, 2004, the disclosure of which is expressly incorporated by reference herein in its entirety.

BACKGROUND OF THE INVENTION

The present invention relates to a method for the attachment of a fastener element to a component, for example a sheet metal part, wherein the fastener element has an axis of symmetry, a head part having a contact surface which enters into contact with the component, a fastening section having a thread and also at least one undercut which receives the material of the component, and wherein the material of the component is pressed against the contact surface and into the undercut by means of a first tool having a die button shape matching the design of the fastener element.

A method and an apparatus of the initially named kind are extremely well-known in the field of attachment of the fastener elements to sheet metal parts. For example the European patents 0 678 679 and 0 958 100 describe how a fastener element which is available in commerce under the designation EBF from the company Profil Verbindungstechnik GmbH & Co. KG can be attached to a sheet metal part. Furthermore, the European patents 0 759 510 and 0 957 273 describe how variants of the so-called nut elements of the company Profil Verbindungstechnik GmbH & Co. KG can be attached to sheet metal parts. The above-described elements are frequently termed press-in elements because they do not have any rivet section which has to be beaded over.

In order to carry out the previously known methods presses with considerable pressing forces are mainly used which take care of the attachment of the fastener element to the sheet metal parts and indeed in particular when the sheet metal part is also to be given a specific shape in the press.

Not only elements of the company Profil Verbindungstechnik GmbH & Co. KG are attached to sheet metal parts in this way and means but rather also a series of further fastener elements from other competitors. It is also known, instead of using a press/for the attachment of the fastener elements, to secure these in C-frames and/or by means of robots to sheet metal parts and in both cases corresponding force-generating devices must be present which often have to produce forces in tons in two figures.

Using such apparatuses the fastener elements are attached in one stroke to the sheet metal part, the process thus takes place relatively quickly.

There are, however, a large number of possible applications in smaller and larger workshops, for example for the manufacture of smaller series when no heavy presses or the other named devices (C-frames or robots) are available, either because the corresponding companies do not have such devices or because these are otherwise fully employed.

BRIEF DESCRIPTION OF THE INVENTION

It is thus the object of the present invention to propose reliable methods and apparatus which are able to attach fastener elements of the initially named kind to sheet metal parts without considerable forces being required for this, so that companies are also in a position, even without high investments in relatively heavy equipment, to attach fastener elements to components, in particular to sheet metal parts reliably, and with the method of the invention and the apparatus in accordance with the invention being able to be used for a large number of different fastener elements.

Although the invention is primarily intended for use with sheet metal parts there are also other components such as components of plastic or in the form of laminates or cast parts of ductile materials which can be processed by means of the present invention.

In order to satisfy this object a method of the initially named kind is provided which is characterized in that a local force is exerted on the head part of the fastener element or onto the tool to the side of the axis of symmetry and is moved circularly around the axis of symmetry while simultaneously carrying out a relative feed movement between the tool and the fastener element between which the component is arranged in order to press the material of the component into the undercut.

The fastener element can be a bolt element, for example an EBF element, with the thread being formed on a shaft part of the fastener element and with the shaft part being guided through a pre-holed component prior to the exertion of the local force for the movement of the material of the component into the undercut.

Alternatively the fastener element can be a nut element, for example an RSU element, with the thread being formed as a threaded bore of the fastener element and optionally being arranged in the head part, and the method can be carried out with a holed component or an unholed component, which is in principle also possible with a bolt element. It should be pointed out that with a nut element which is guided through a pre-holed component the thread can be cut subsequently, i.e. after the attachment of the element to the component, by the use of a thread forming or thread cutting screw.

Thus, in accordance with the invention, instead of using a large rapidly acting force a substantially lower force is used which acts locally on the fastener element and/or on the component, and indeed over a comparatively long time (which can however straight forwardly lie in the range of seconds), with the force being moved progressively about the axis of symmetry of the fastener element and acting locally on the fastener element or on the sheet metal part until the attachment, i.e. the hooking of the material of the component to the fastener element or to the undercut or undercuts that is or are provided is completed. Since the force that is used is significantly smaller than the forces previously used the apparatus required to carry out the method is substantially less loaded and can accordingly be made lighter and more compact and requires less material than was previously necessary.

Furthermore, on carrying out the method, it is possible to operate with die buttons which are identical to the die buttons previously used for the corresponding elements, or which have only been insignificantly modified so that proven systems which have been tested in practice can continually be used with the new method and with the new apparatus.

Particularly preferred variants of the method of the invention and also of the corresponding apparatuses can be seen from the patent claims and also from the further description.

BRIEF DESCRIPTION OF THE DRAWINGS

The invention will subsequently be explained in more detail by way of example only with reference to the drawings and with reference to embodiments. In the drawings.

DETAILED DESCRIPTION OF THE PREFERRED EMBODIMENT

Figure 1A:
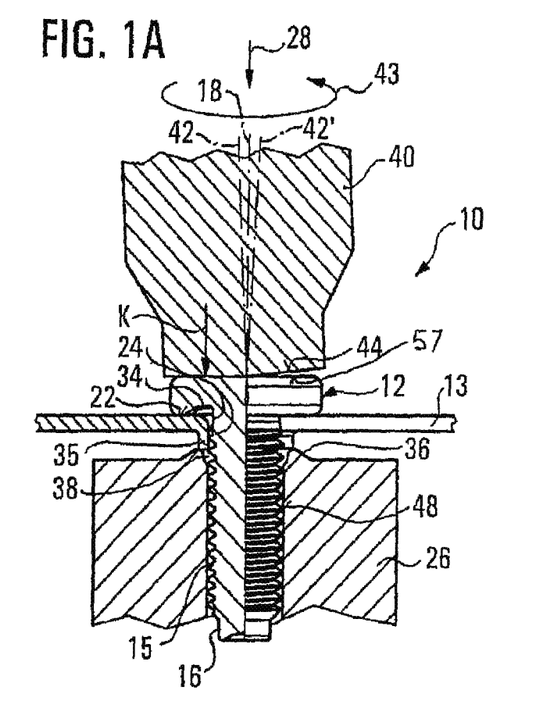
FIG. 1A shows a first embodiment in accordance with the invention of the attachment of a bolt element known per se to a sheet metal part immediately prior to the start of the reshaping of the sheet metal part.
Figure 1B:
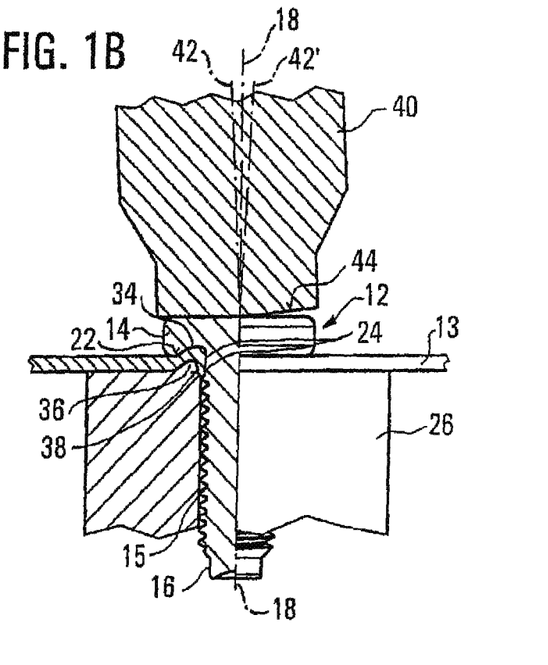
FIG. 1B shows an illustration in accordance with FIG. 1A however just at the end of the shaping of the sheet metal part.

Referring to FIGS. 1A and 1B an apparatus 10 is shown which is designed in order to carry out a method for the attachment of the fastener element 12 to a pre-holed plastically deformable component 13, for example to a sheet metal part. The fastener element has a head part 14 and a shaft part 16 having a thread which is arranged concentric to an axis of symmetry 18 of the fastener element and which merges via a contact surface 22 extending in the radial direction into the head part 14. The fastener element is in this specific case an EBF bolt element of the company Profil Verbindungstechnik GmbH & Co. KG, so that the fastener section, which enables the later attachment of a further component to the component assembly consisting of the bolt element and the first component by a nut screwed onto the shaft part 16, is realized here by a thread arranged concentric to the axis of symmetry. The fastener element illustrated here is to be understood as being representative for a large number of different elements and has, moreover; at least one undercut which receives the material of the component. As shown in FIG. 1B the material of the component 13 is pressed against the contact surface 22 and into the undercut 24 by means of a first tool 26 having a die button shape matched to the design of the fastener element, the tool here being a customary die button for EBF elements.

In accordance with the invention a local force K is exerted onto the head part 14 of the fastener element 12 to the side of the axis of symmetry 18. The position of this force is moved circularly around the axis of symmetry and at the same time a relative feed movement takes place in the direction of the arrow 28 between the tool 26 and the fastener element between which the component is arranged, in order to press the material of the component into the undercut 24.

The fastener element 12 has, in addition to the radial undercut 24, which can be formed by the thread 15 in the region of the head part, an axial ring groove 34 or concave fields in the contact surface 22. The shaft part 16 of the fastener element is passed through a ring collar 35 surrounding the hole of the pre-holed component 13 from the side of the component remote from the ring collar 35.

The die button 26 has a central ring projection 36 with an at least substantially conical inner surface 38 which presses the material of the ring collar 35 radially inwardly into the undercut 24, as can be seen from FIG. 1B. Furthermore, the ring projection presses the sheet metal material into the ring groove 34.

The local force K is exerted onto the head part 14 of the fastener element 12 with a second tool 40 which is arranged in an inclined position 42 related to the axis of symmetry 18 and is rotated about the axis of symmetry 18 (arrow 43). The second tool 40 has a conical end face 44 facing the head part 14 of the fastener element and operates in this example directly on the head part 14 of the fastener element 12.

The relative axial feed movement (arrow 28) between the die button 26 which receives the head part 14 and the tool 40 is carried out until the ring collar 35 has been completely beaded over and brought into contact with the fastener element 12 as is shown in FIG. 1B. Since the tool 40 is aligned with the inclined axis 42 and is rotated about the axis of symmetry 18 the inclined axis 42 continuously moves and can for example be found at 42' at a later point in time.

At any point in time during the re-shaping of the sheet metal part the die button projection 36 is in contact with the ring collar over only a comparatively small surface which progressively moves around the axis of symmetry 18 on rotation of the tool 40 and leads to a progressive local deformation of the ring collar. The simultaneously occurring feed movement in the arrow direction 28 leads, in combination with this rotary movement, to a progressive hooked engagement of the sheet metal material with the ring groove or the concave fields in the contact surface, i.e. in the corresponding side of the head part and also with the undercut, so that this hooking can be completed with only a few rotations of the tool 40 in total.

For carrying out this process and apparatus (not shown) similar to a pillar drilling machine or drill press can be used in which the die button 26 is mounted on the table of the pillar drill and the second tool 40 on the drilling head of the pillar drill, and indeed in a position corresponding to the oblique axis 42 which ensures the rotation about the axis of symmetry 18. The feed movement can take place by hand by manual feeding of the drilling head towards the table (as usual in a pillar drill) or by a drive which moves the table towards the drilling head or the drilling head towards the table. Naturally special apparatuses can also be provided which ensure the required movements. The sheet metal part can be positioned by hand or by a small robot onto the shaft part 16 of the bolt element and onto the die button, with the shaft part of the bolt element entering into a central bore 48 of the die button 40. The sheet metal part can be secured or clamped to the table or to a support (not shown) adjacent to or disposed surrounding the die button 26, providing the die button 26 is not itself used for this purpose, which is entirely possible.

During the re-shaping of the sheet metal any features providing security against rotation which are provided at the fastener element, for example in the region of the contact surface 22 and/or at the transition from the shaft part 16 into the contact surface 22 can be brought into engagement with the component 13. Such features providing security against rotation can for example have the form of radial ribs which bridge the ring groove 34 and subdivide this into concave fields, as is the case with an EBF bolt.

In a further development of the method the second tool 40 can be rotated not only about the axis of symmetry 18 of the fastener element but rather simultaneously about the inclined axis 42 which is defined by the inclined position of the second tool. An additional rotary movement of this kind is indicated by the arrow 43 in FIG. 1A.

Figure 2A:
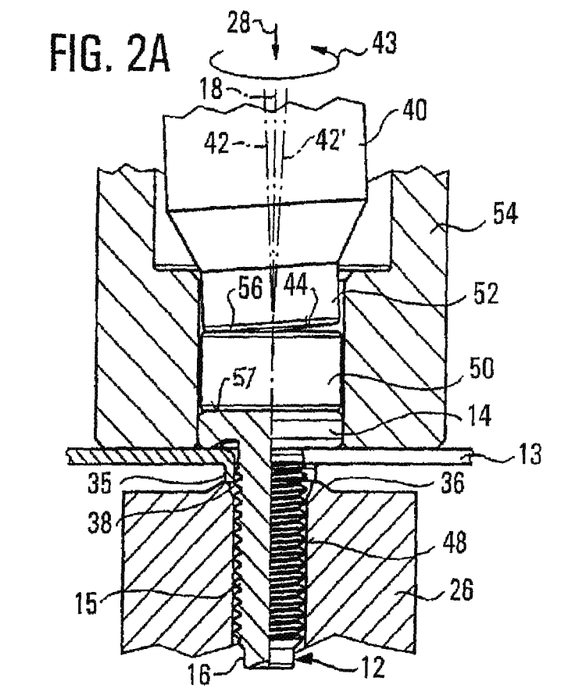
FIGS. 2A and 2B shows Figures corresponding to FIGS. 1A and 1B but of a variant of the method of the invention and of the apparatus of the invention.
Figure 2B:
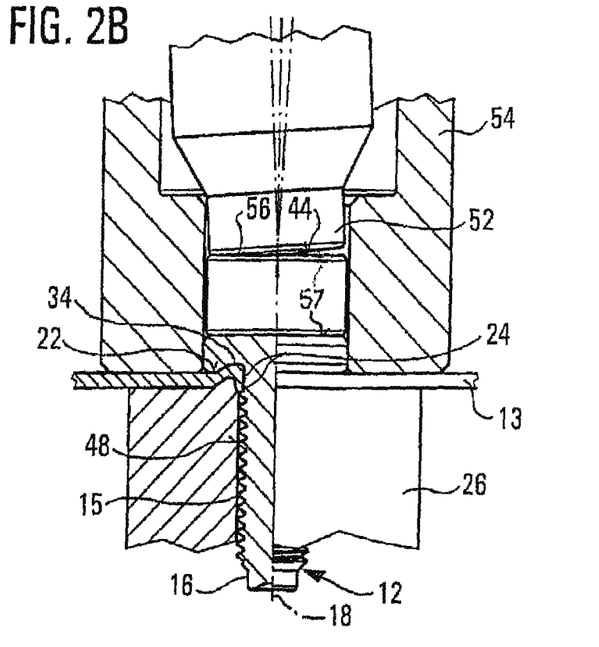

A further variant of the method and of the apparatus will now be described with reference to FIGS. 2A and 2B. In the description of FIGS. 2A and 2B the same reference numerals will be used for parts as were previously used for corresponding parts or parts having the same function in the embodiment of FIGS. 1A and 1B. It will be understood that the same description applies to these parts as for corresponding parts of the embodiment of FIGS. 1A and 1B, unless something to the contrary is expressed. This convention will be used throughout the further description. When only small differences are present between corresponding parts, the parts will be identified by the same reference numerals but additionally supplemented with a prime, such as ', '', ''', '''' or '''''.

In this variant the second tool 40 operates via a cylindrical intermediate piece 50 on the head part 14 of the fastener element 12. The cylindrical intermediate piece 50 and a front section 52 of the second tool 40 facing the cylindrical intermediate piece are guided by a tubular guide part 54 with some radial clearance.

The end face 44 of the second tool 40 facing the head part 14 of the fastener element 12 has an at least substantially linear contact 56 with the intermediate piece 50.

Whereas the second tool 40 operates in the embodiment of FIGS. 1A and 1B on a ring surface 57 of the head part of the fastener element the cylindrical intermediate piece 50 does this in the embodiment of FIGS. 2A and 2B.

In this embodiment any features providing security against rotation which are provided on the fastener element, for example in the region of the contact surface and/or at the transition from the shaft part into the contact surface are also brought into engagement with the component 13 during the re-shaping movement.

The possibility also exists here of rotating the second tool 40 not only about the axis of symmetry 18 of the fastener element but rather simultaneously also about the axis of inclination 42 which is defined by the inclined position of a second tool 40.

The design of the die button 26 and the reception of the shaft part 16 of the fastener element in the bore 48 of the die button are identical to the embodiment of FIGS. 1A and 1B and they are not be especially described here.

Figure 3A:
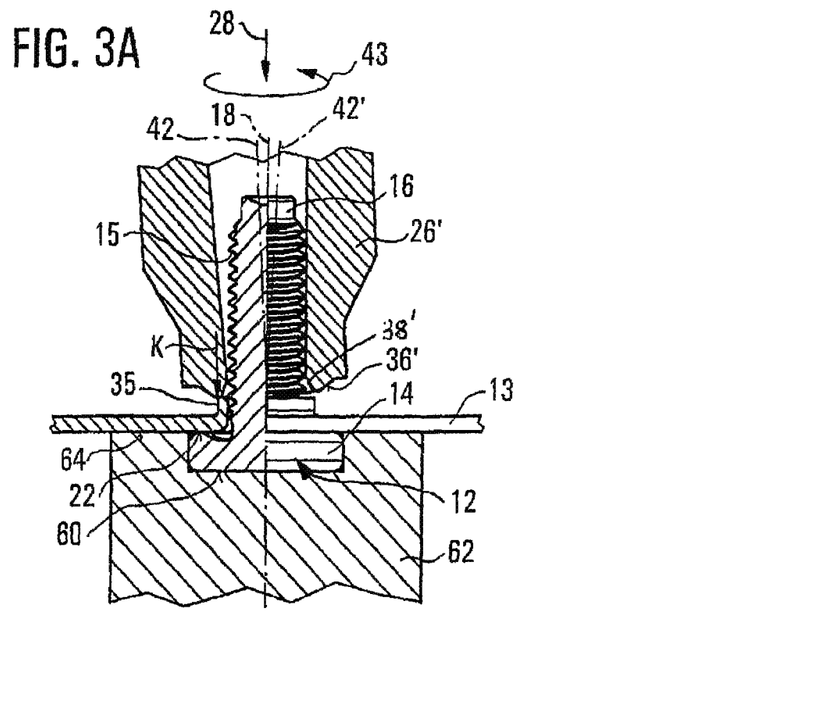
FIGS. 3A and 3B shows Figures corresponding to FIGS. 1A and 1B but of a further variant of the method of the invention and of the apparatus of the invention.
Figure 3B:
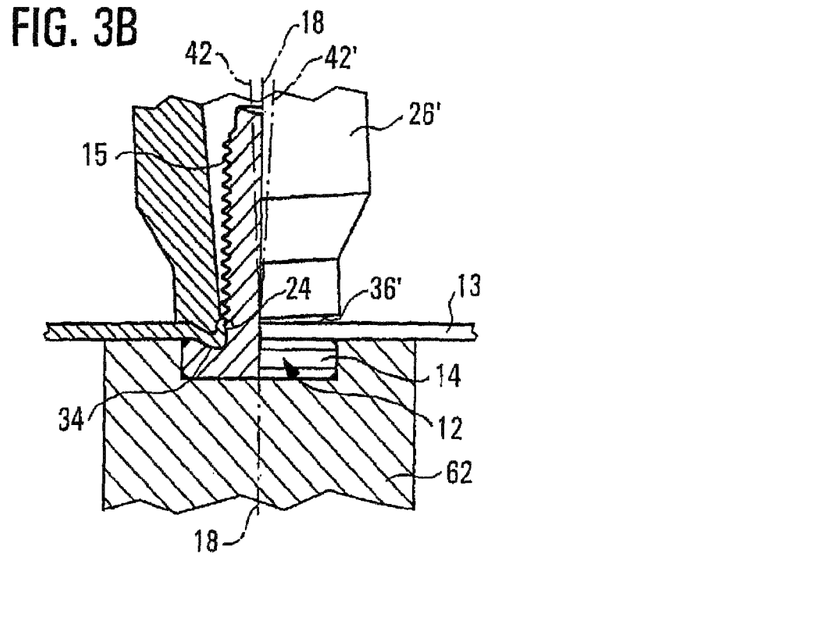

A third method in accordance with the invention and a third apparatus in accordance with the invention for the attachment of a fastener element, which has already been described in detail in connection with FIGS. 1A and 1B, are shown in FIGS. 3A and 3B. In the description of FIGS. 3A and 3B the same reference numerals will be used for parts as were previously used for corresponding parts or parts having the same function in the FIGS. 1A and 1B embodiment. It will be understood that the same description applies to these parts as for the corresponding parts of the embodiment of FIGS. 1A and 1B, unless something to the contrary is expressed.

As shown in FIG. 3A the head part 14 of the fastener element 12 is received in a cut-out 60 of a tool 62 the end face 64 of which supports the component 13 at least substantially at the level of the contact surface 22. The local force K is exerted onto the component 13, in particular onto its ring collar 35 via a tool 26' which has at its lower end face in FIG. 1A a shape corresponding to the end face of the die button 26 of the previous embodiments, with the shape of the ring projection 36' having been slightly eased, i.e. relieved relative to the ring projection 36 of the die button 26 of FIGS. 1A, 1B, and 2A, 2B in order to take account of the swashing movement of the tool 26'. As a result of the small differences the tool is designated with the reference numeral 26' and the ring projection with its inner surface with the reference numerals 36' and 38' respectively. The tool 26' is arranged in an inclined position related to the axis of symmetry 18 and is rotated in the arrow direction 43 about the axis of symmetry 18.

Here the first tool 26' operates directly on the component in the region of the fastener element.

In this embodiment, during the re-shaping movement, any features providing security against rotation which are attached to the fastener element, for example in the region of the contact surface and/or at the transition from the shaft part into the contact surface are also brought into engagement with the component 13.

Here the possibility also exists of not only rotating the tool 26' about the axis of symmetry of the fastener element but rather simultaneously also about the axis of inclination 42, which is defined by the inclined position of the tool 26'.

Figure 4A:
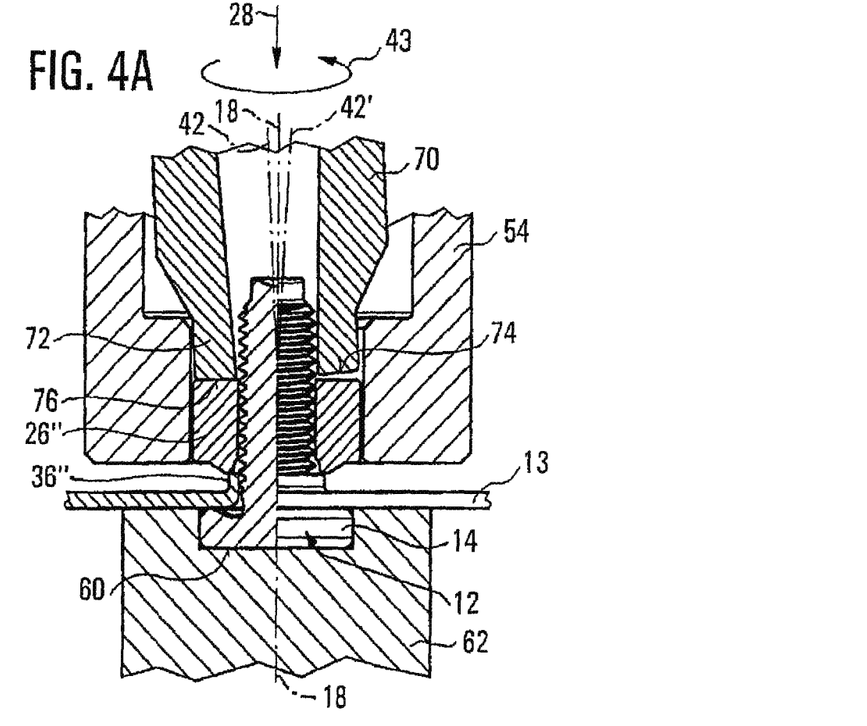
FIGS. 4A and 4B shows Figures corresponding to FIGS. 1A and 1B but of another variant of the method of the invention and of the apparatus of the invention.
Figure 4B:
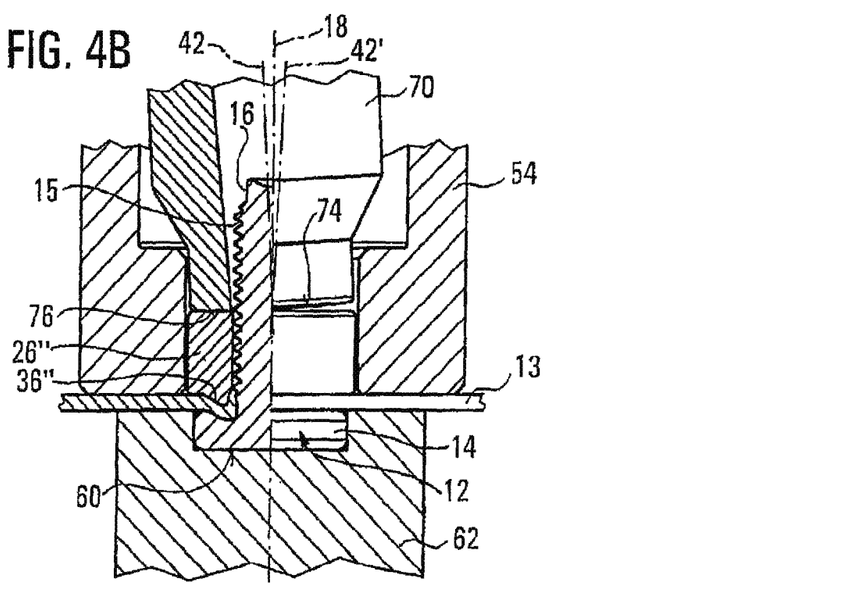

A fourth method in accordance with the invention and a further fourth apparatus in accordance with the invention for the attachment of the fastener element, which has already been described in detail in connection with the FIGS. 1A and 1B are illustrated in FIGS. 4A and 4B. In the description of FIGS. 4A and 4B the same reference numerals will be used for parts as were previously used for corresponding parts or parts having the same function. It will be understood that the same description applies for these parts, as for the corresponding parts of the embodiments, unless something is expressed to the contrary.

This fourth embodiment is characterized in that the first tool 26" is formed as a cylindrical intermediate piece which operates on a component in the region of the fastener element and in that a third tool 70 exerts the local force K on the first tool 26".

The first tool 26" and a front section 72 of the third tool facing this cylindrical intermediate piece are guided by a tubular guide part 54 with some radial clearance. The end face 74 of the third tool 70 facing the component has a conical shape and an at least substantially linear contact 76 with the side of the first tool 26" remote from the component.

In this embodiment any features providing security against rotation which are provided on the fastener element, for example in the region of the contact surface and/or at the transition from the shaft part into the contact surface are also brought during the re-shaping movement into engagement with the component 13.

Here the possibility also exists of not only rotating the third tool 70 about the axis of symmetry of the fastener element but rather simultaneously also about the axis of inclination 42 which is defined by the inclined position of the second tool 40.

Figure 5A:
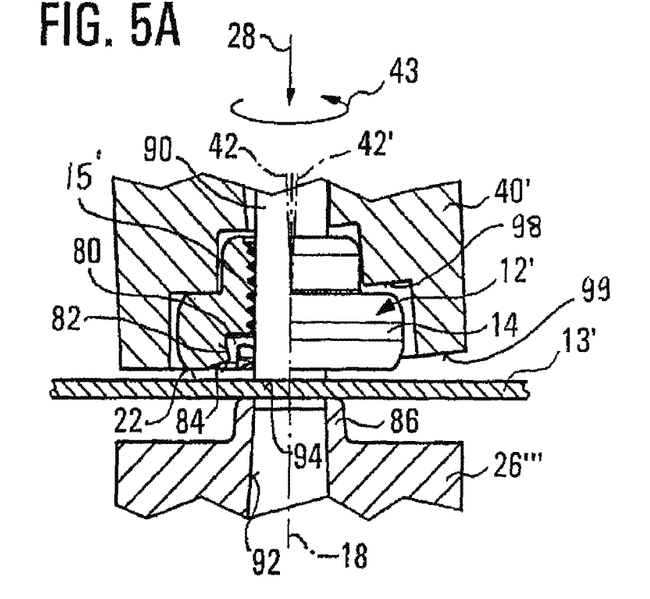
FIG. 5A shows a first embodiment in accordance with the invention of the attachment of a nut element known per se to a sheet metal part just before the start of the reshaping of the sheet metal part.
Figure 5B:
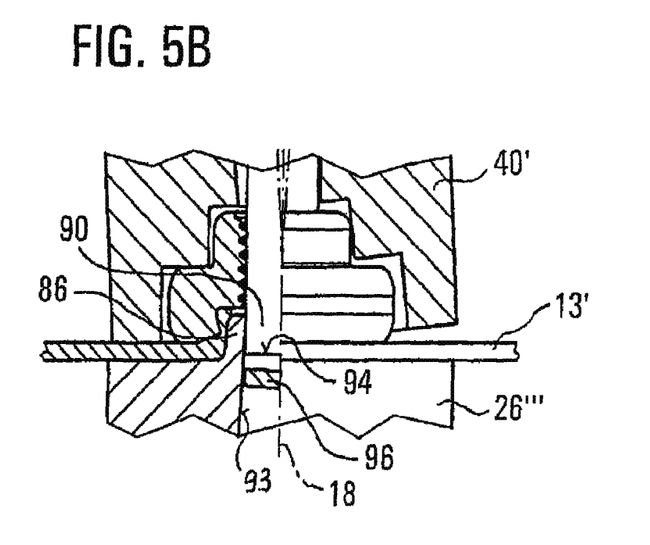
FIG. 5B shows an illustration corresponding to FIG. 5A but just at the end of the reshaping of the sheet metal part.

A further variant of the method of the invention and of the apparatus of the invention is shown in FIGS. 5A and 5B. The fastener element 12' here is a nut element, with the thread being formed as a threaded bore 15' of the fastener element and optionally being able to be arranged in the head part 14. The method can in this embodiment, as also in the later embodiments in accordance with FIGS. 6A, 6B; 7A, 7B; and 8A, 8B be carried out with a holed or non-holed component 513'.

In the subsequent description of the further embodiments the same reference numerals will be used for parts which have the same function as parts in the first four embodiments and it will be understood that the previous description applies in analogous manner for these parts. As is evident the four further embodiments in accordance with the Figures which have yet to be described can be understood almost identically to the first four embodiments so long as one takes account of the fact that they relate to a nut element instead of a bolt element, with the nut element being designed differently than the bolt element, above all in the region of the attachment to the sheet metal part. The element shown here is an RSU element as recited above. Other than in the embodiment in accordance with the further Figures it is however also possible for the component to be a non-holed component which is pierced during the attachment of the nut element. Nonetheless the nut element can also be used with a pre-holed component and indeed with a pre-holed component which is provided with a ring collar such as 35 in accordance with the previous Figures.

The nut element in all the following examples is an RSU element as recited above. In accordance with this the fastener element 12 has, in the head part 14, radially inside an at least substantially ring-like contact surface 22, a recess 80 with at least one radial undercut, for example a ring-like undercut or preferably (as realized in the actual RSU element) with discrete undercuts 82 formed locally at a wall of the cut-out, with which corresponding recesses 84 provided locally in the ring-like contact surface 22 are preferably associated. Through the action of the first tool 26" having the die button shape the material of the component is pressed into the undercut(s) 82 and into the recesses 84.

When the component 13 is a pre-holed component the first tool 26" having the die button shape presses the sheet metal material around the collar of the hole produced by the pre-holing into the cut-out 80.

Alternatively, when the component 13 is a pre-holed component with a ring collar 35 which surrounds the hole produced by the pre-holing and which is introduced into the cut-out 80, the first tool 26''' having the die button shape presses the sheet metal material in the region of the ring collar 80 into the undercut(s) 82.

The tool 26''' having the die button shape presses the material of the component also into the recesses 84 provided locally in the ring-like contact surface.

For the above described purposes the first tool 26''' having a die button shaped as a central, tubular, optionally conically shaped projection 86 which presses the material of the component radially outwardly into the undercut(s) 82 and optionally into the cut-out 80 or into the recesses 84.

The piercing of the sheet metal component takes place in the subsequently described embodiments in that the component is a non-holed component and the tool which receives the fastener element 12, i.e. the second tool has a pin 90 disposed concentric to the fastener element which passes through the bore 92 of the fastener element 12" and the free end of which 94 cooperates with the hollow first tool 26''' having the die button shape in order to cut out a die button 96 from the component 13' with the slug being disposed of through the central bore 92 of the tool 26''' having the die button shape.

In the embodiment of FIGS. 5A and 5B the first tool having the die button shape is a normal die button for the attachment of an RSU element. The local force K is exerted onto the head part of the fastener element with the second tool which is disposed in an inclined position 42 related to the axis of symmetry 18 and is rotated about the axis of symmetry 18.

The second tool 40' has a conical end face 98 which faces the head part 14 of the fastener element 12' and a conical end face 99. In this embodiment the conical face 98 of the second tool 40' operates directly on the head part 14 of the fastener element 12.

Figure 6A:
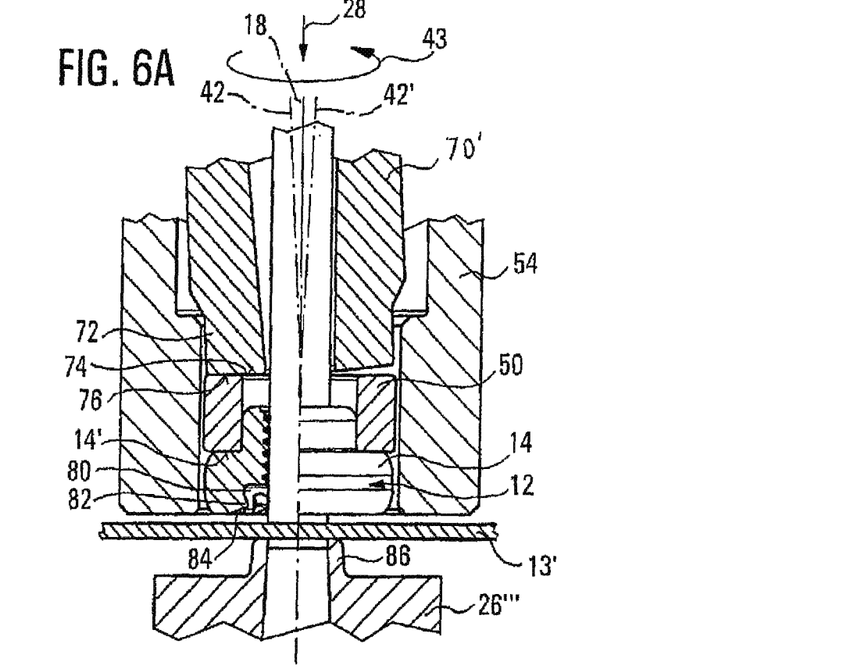
FIGS. 6A and 6B shows Figures corresponding to FIGS. 5A and 5B but of a variant of the method of the invention and of the apparatus of the invention.
Figure 6B:
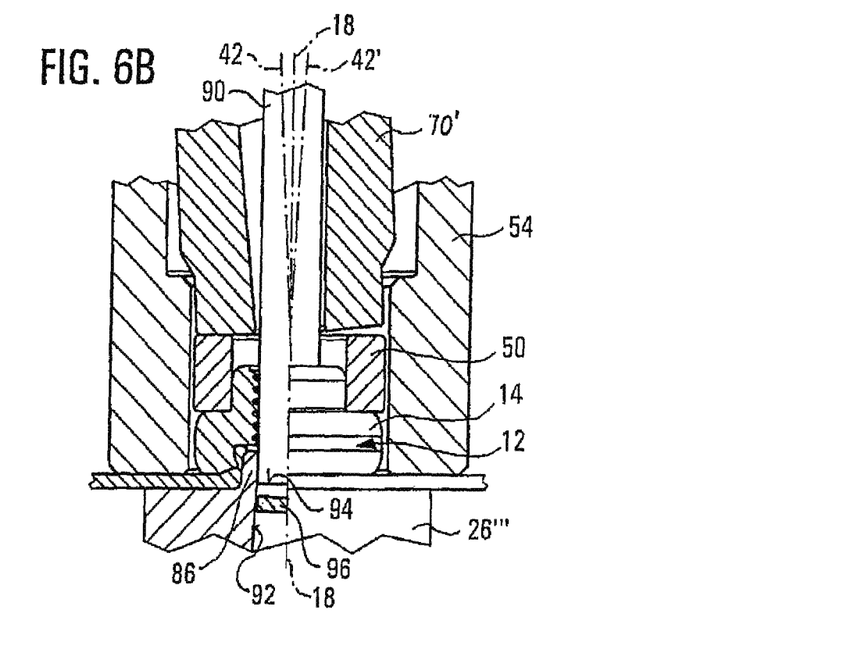

As an alternative to this the second tool 70' can operate in accordance with the embodiment of FIGS. 6A and 6B via a cylindrical immediate piece 50 on the head part 14 of the fastener element 12'.

As previously the cylindrical intermediate piece 50 and a front section 72 of the second tool 70 facing the cylindrical intermediate piece can be guided by a tubular guide part 54 with some radial clearance. The conical end face 74 of the second tool 70 facing the head part 14 of the fastener element 12' has an at least substantially linear contact 76 with the cylindrical intermediate piece 50. Here also the cylindrical intermediate piece 50 operates on a ring surface 14' of the head part of the fastener element.

Figure 7A:
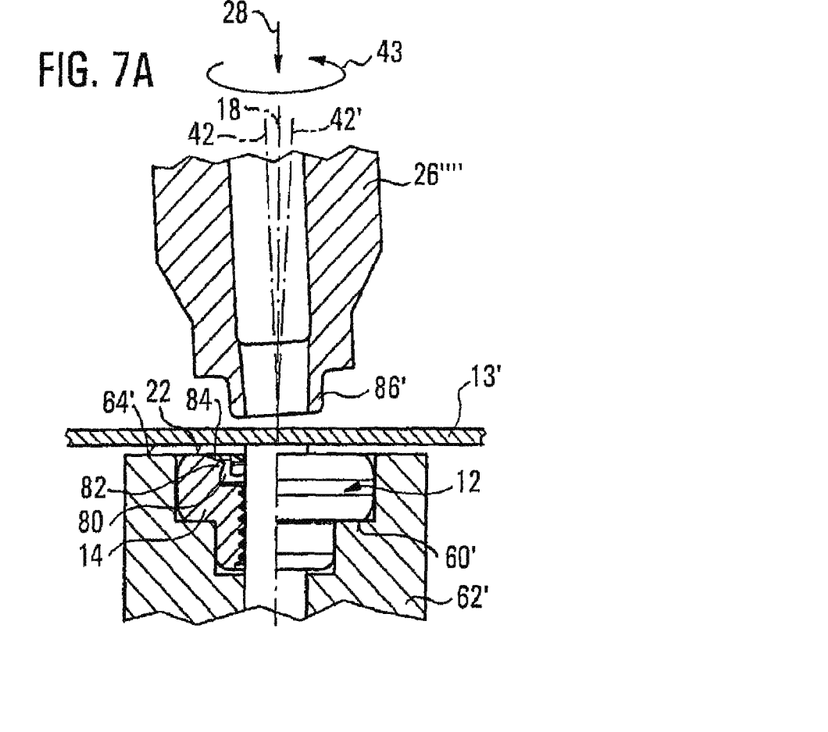
FIGS. 7A and 7B shows Figures corresponding to FIGS. 5A and 5B but of a further variant of the method of the invention and of the apparatus of the invention.
Figure 7B:
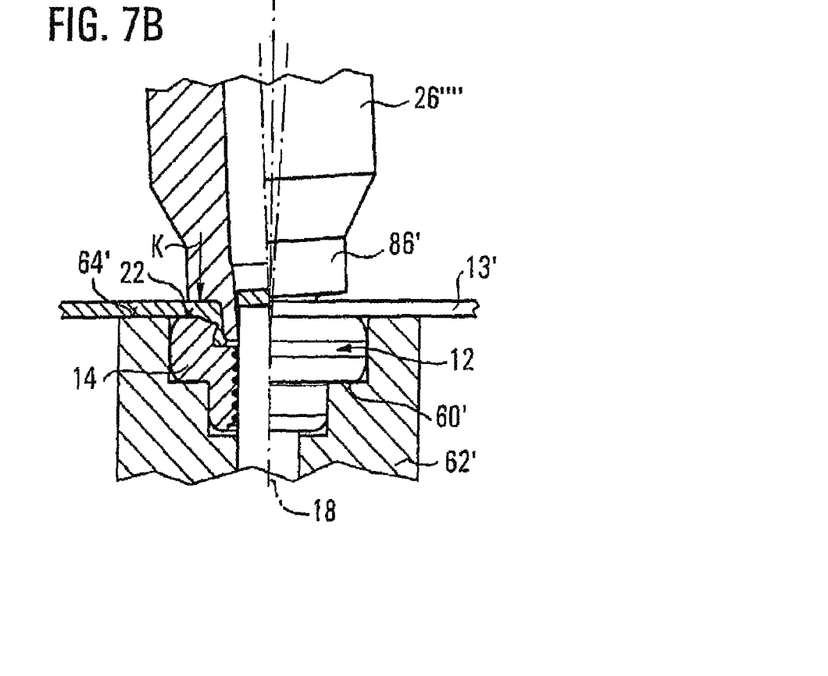

In the next embodiment in accordance with FIGS. 7A and 7B the head part 14 of the fastener element 12' is received in a cut-out 60' of a tool 62', the end face 64' of which supports the component 13' at least substantially at the level of the contact surface 22'. The first tool 26"", which exerts the local force K onto the component 13' is disposed in an inclined position 42 radial to the axis of symmetry 18 and is rotated about the axis of symmetry 18. Here the first tool 26"" operates directly on components 13' in the region of the fastener element 12'.

Figure 7C:
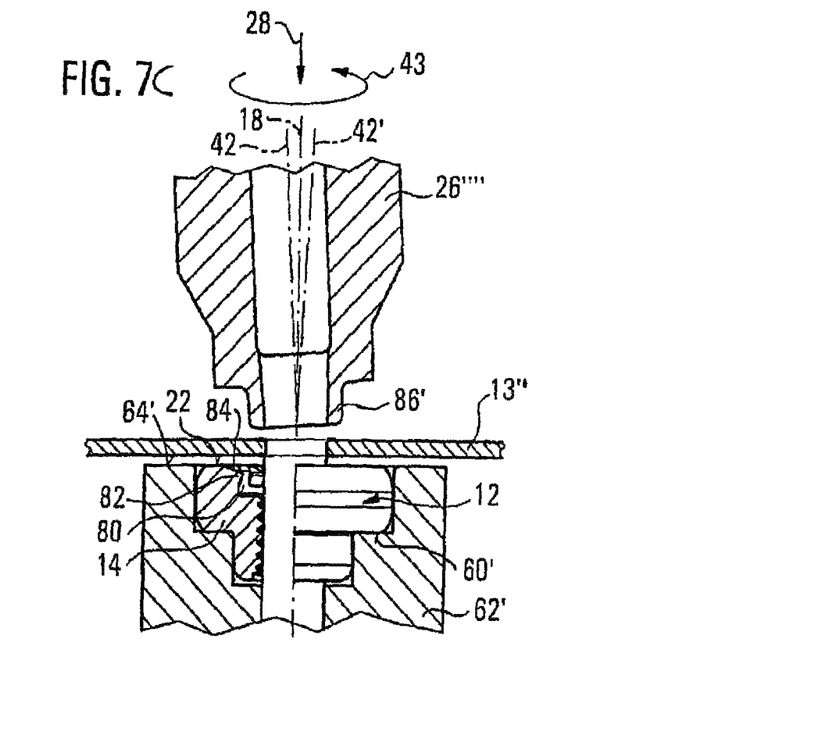
FIGS. 7C and 7D shows Figures corresponding to FIGS. 7A and 7B but of a further variant of the method of the invention and of the apparatus of the invention.
Figure 7D:
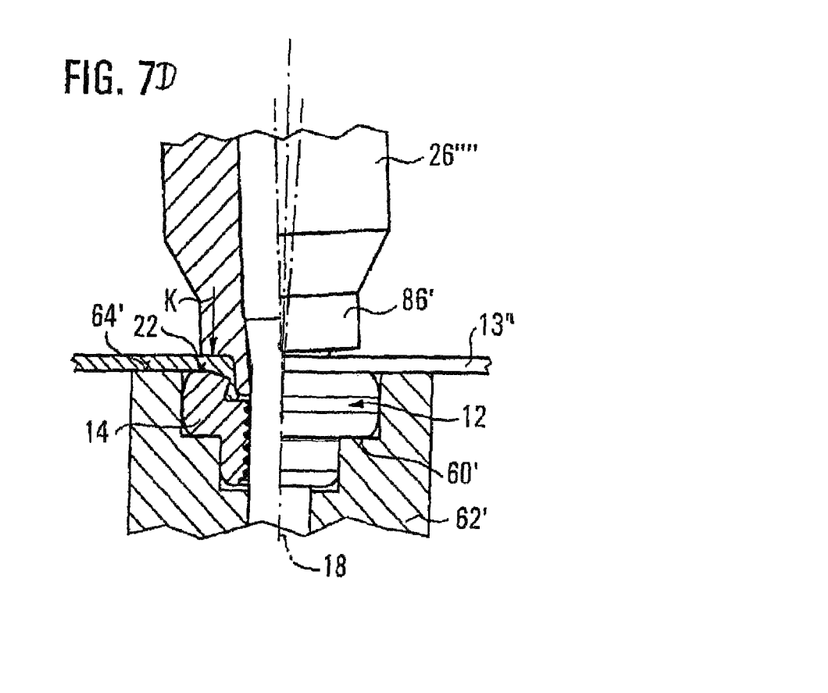

In the next embodiment in accordance with FIGS. 7C and 7D the head part 14 of the fastener element 12' is received in a cut-out 60' of a tool 62', the end face 64' of which supports a pre-holed component 13" at least substantially at the level of the contact surface 22'. The first tool 26"", which exerts the local force K onto the pre-holed component 13" is disposed in an inclined position 42 radial to the axis of symmetry 18 and is rotated about the axis of symmetry 18. Here the first tool 26"" operates directly on pre-holed components 13" in the region of the fastener element 12'.

Figure 7E:
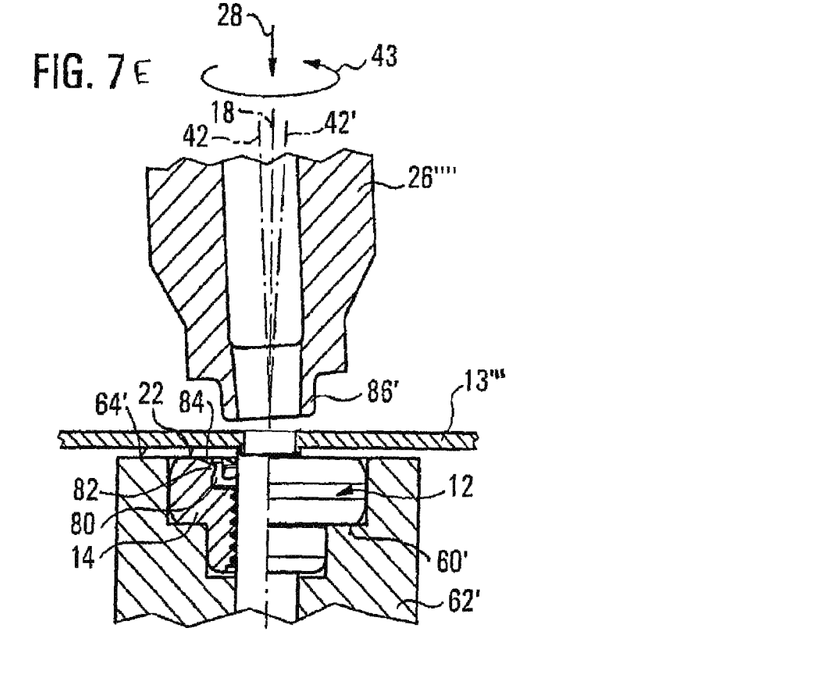
FIGS. 7E and 7F shows Figures corresponding to FIGS. 7A and 7B but of a further variant of the method of the invention and of the apparatus of the invention.
Figure 7F:
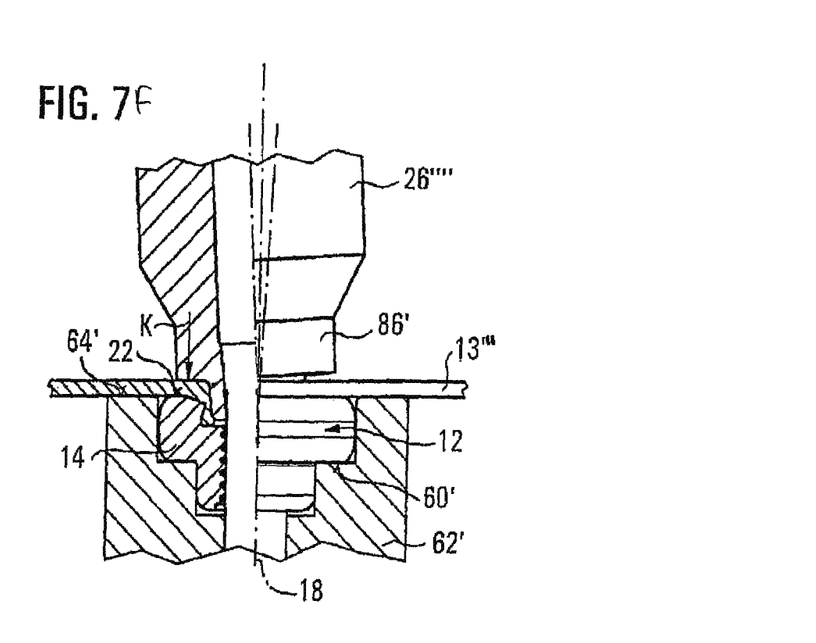

In the next embodiment in accordance with FIGS. 7E and 7F the head part 14 of the fastener element 12' is received in a cut-out 60' of a tool 62', the end face 64' of which supports a pre-holed component 13''' having a ring collar at least substantially at the level of the contact surface 22'. The first tool 26"", which exerts the local force K onto the pre-holed component 13''' having a ring collar is disposed in an inclined position 42 radial to the axis of symmetry 18 and is rotated about the axis of symmetry 18. Here the first tool 26"" operates directly on pre-holed components 13''' having a ring collar in the region of the fastener element 12'.

Figure 8A:
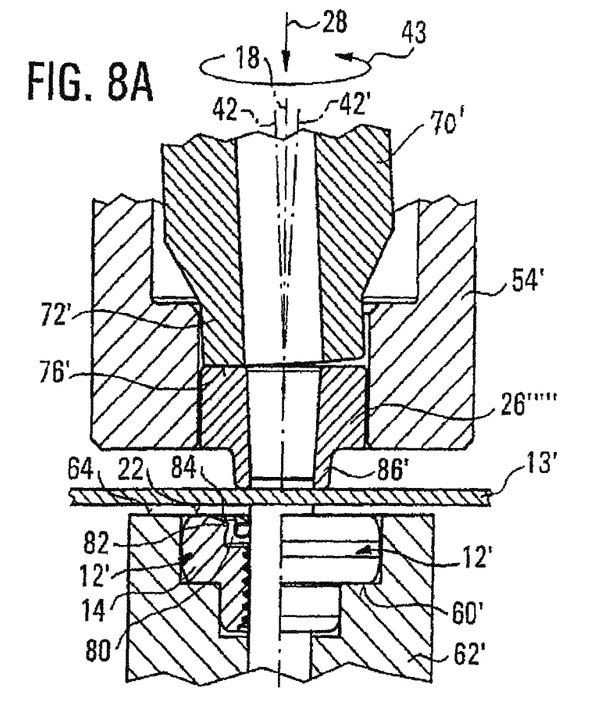
FIGS. 8A and 8B shows Figures corresponding to FIGS. 1A and 1B but of another variant of the method of the invention and of the apparatus of the invention.
Figure 8B:
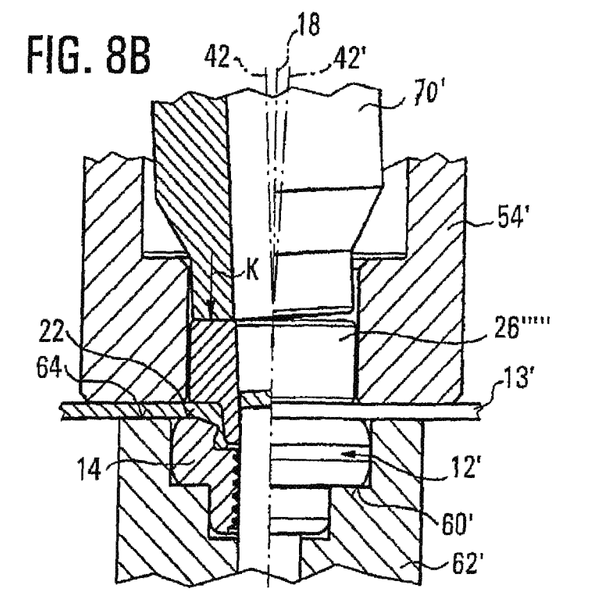

In the last embodiment in accordance with FIGS. 8A and 8B the first tool 26""' having the die button shape is formed as a cylindrical intermediate piece which operates on the component 13' in the region of a fastener element 12'. The tool 70' exerts the local force K onto the first tool 26""'.

Here also the first tool 26""' and a front section 72' of the tool 70' facing it are guided by a tubular guide part 54' in some radial clearance. Furthermore, the end face 76' of the first tool which faces the component also has an at least substantially linear contact with the first tool 26"" here. The tool 70' has for this purpose a conical end face facing the head part of the fastener element.

In all the embodiments the fastener element can have features providing security against rotation in the region of the contact surface and/or of the transition from the contact surface into any shaft part that is provided and/or in the region of a hollow recess of the fastener element, with the material of the component also being brought into engagement with the features providing security against rotation by the action of the local force and the feed movement, with the features providing security against rotation optionally also being able to be realized by the at least one undercut or by recesses in the contact surface.

Finally it should be pointed out that all steel or aluminum or magnesium sheet metal parts can be considered for the sheet metal parts which have deep drawing qualities, whereas somewhat firmer materials are used for the fastener element.

In all embodiments all materials can be named as an example for the material of the fastener elements which achieve strength values of class 8 in accordance with the ISO standard in the context of cold deformation, for example a 35B2 alloy in accordance with DIN 1654. The so formed fastener elements are suitable amongst other things for all commercially available steel materials for drawing quality sheet metal parts as also for aluminum or its alloys. Aluminum alloys, in particular those with higher strength, can also be used for the fastener elements, for example AlMg5. Fastener elements of higher strength magnesium alloys such as for example AM50 can also be considered.

What is claimed:

1. A method for attachment of a fastener element to a component, wherein the fastener element is a nut element and has an axis of symmetry, a head part having a contact surface which enters into contact with the component, a threaded bore and also at least one undercut which receives the material of the component, and wherein the material of the component is pressed against the contact surface and into the undercut by means of a first tool having a die button shape matching the design of the nut element, wherein a local force is exerted on the head part of the nut element or onto the first tool to the side of the axis of symmetry and is moved circularly around the axis of symmetry while simultaneously carrying out a relative feed movement between the first tool and the nut element between which the component is arranged in order to press the material of the component into the undercut, wherein the head part of the nut element is received in a cut-out of a second tool the end face of which supports the component at least substantially at the level of the contact surface and wherein the local force is exerted onto the component with the first tool which is arranged in an inclined position related to the axis of symmetry and is rotated about the axis of symmetry.

2. The method in accordance with claim 1, wherein the method can be carried out with a pre-holed or a non-holed component.

3. The method in accordance with claim 1, wherein the first tool operates directly on the component in the region of the nut element.

4. The method in accordance with claim 2, wherein the end face of the first tool facing the component has an at least substantially linear contact with the component.

5. The method in accordance with claim 2, wherein the nut element has a cut-out with at least one radial undercut radially inside an annular contact surface, wherein material of the component is pressed into the at least one radial undercut through the action of the first tool having the die button shape.

6. The method in accordance with claim 5, wherein the component is a pre-holed sheet metal part and wherein the first tool having the die button shape presses the material of the sheet metal part around the rim of the hole produced by the pre-holing also into recesses.

7. The method in accordance with claim 5, wherein the component is a pre-holed component with a ring collar surrounding the hole produced by the pre-holing which is introduced into the cut-out and wherein the first tool having the die button shape presses the sheet metal material in the region of the ring collar into the undercut(s).

8. The method in accordance with claim 5, wherein the tool having the die button shape presses material of the component also into the recesses provided locally in the annular contact surface.

9. The method in accordance with claim 2, wherein the first tool having a die button shape has a central tubular projection which presses the material of the component radially outwardly into the undercut(s) and optionally into the cut-out.

10. The method in accordance with claim 2, wherein the component is a non-holed component and wherein the tool which receives the nut element, or the second tool, has a pin arranged concentric to the nut element which projects through the bore of the nut element and the free end face of which cooperates with the hollow first tool having the die button shape in order to cut a slug out of the component which is disposed of through the central bore of the tool having the die button shape.

11. The method in accordance with claim 1, wherein the nut element has features providing security against rotation in the region of the contact surface and in the region of a hollow recess of the nut element, wherein material of the component is brought by the action of the local force and the feed movement also into engagement with the features providing security against rotation which can optionally be realized by the at least one undercut or by recesses in the contact surface.

12. The method for the attachment of a fastener element according to claim 1, wherein the component is a sheet metal part.

13. The method in accordance with claim 5, wherein the nut element has an annular undercut or discrete undercuts formed at a wall recess with which corresponding recesses provided locally in the annular contact surface are associated and wherein material of the component is pressed into the annular undercut or discrete undercuts through the action of the first tool having the die button shape.

14. The method in accordance with claim 1, wherein the nut element has features providing security against rotation in the region of the contact surface or in the region of a hollow recess of the nut element, wherein material of the component is brought by the action of the local force and the feed movement also into engagement with the features providing security against rotation.

15. The method in accordance with claim 1, wherein the nut element has features providing security against rotation in the region of the contact surface and in the region of a hollow recess of the nut element, wherein material of the component is brought by the action of the local force and the feed movement also into engagement with the features providing security against rotation which can be realized by the at least one undercut or by recesses in the contact surface.

16. The method in accordance with claim 1, wherein the nut element has features providing security against rotation in the region of the contact surface or in the region of a hollow recess of the nut element, wherein material of the component is brought by the action of the local force and the feed movement also into engagement with the features providing security against rotation which can be realized by the at least one undercut or by recesses in the contact surface.

17. The method in accordance with claim 9, wherein the first tool having a die button shape has a central tubular projection which is slightly conically shaped which presses the material of the component radially outwardly into the undercut(s) and optionally into the cut-out.

* * * * *